United States Patent [19]

Cheung et al.

[11] 4,448,941

[45] May 15, 1984

[54] RESIN BINDER FOR FIBER COMPOSITE MATERIALS

[75] Inventors: Mo-Fung Cheung, Farmington Hills; David L. Garrett, Jr., Southfield; Henk van Oene, Detroit, all of Mich.

[73] Assignee: Ford Motor Company, Dearborn, Mich.

[21] Appl. No.: 328,278

[22] Filed: Dec. 7, 1981

[51] Int. Cl.³ ............................................. C08G 59/16
[52] U.S. Cl. .................................... 525/528; 525/529; 525/530
[58] Field of Search ................. 525/529, 528, 530, 531

[56] References Cited

U.S. PATENT DOCUMENTS

| | | | |
|---|---|---|---|
| 3,971,834 | 7/1976 | Uzelmeier et al. | 260/837 R |
| 4,253,918 | 3/1981 | Trackner et al. | 525/531 |
| 4,293,672 | 10/1981 | Jackson | 525/531 |

FOREIGN PATENT DOCUMENTS

| | | | |
|---|---|---|---|
| 30692 | 6/1981 | European Pat. Off. | 525/531 |
| 1389420 | 1/1965 | France . | |
| 2243212 | 4/1975 | France . | |
| 2065126 | 6/1981 | United Kingdom | 525/531 |

Primary Examiner—John C. Bleutge
Assistant Examiner—Robert E. L. Sellers
Attorney, Agent, or Firm—Lorraine S. Melotik; Roger L. May

[57] ABSTRACT

Free-radical curable amino vinyl ester resin binder compositions for fiber reinforced composite materials with improved interlaminar shear strength and accelerated cure rate. The composition comprises about 80 to about 20 weight percent of amino vinyl prepolymer and about 20 to about 80 weight percent of a crosslinkable diluent, wherein the prepolymer consists essentially of the reaction product of epoxy-amino alcohol adduct and unsaturated monomer having a terminal vinyl group and a hydroxy reactive functionality capable of reacting with the hydroxyl groups of the adduct. The polyepoxide and amino alcohol, preferably a diethanol amine, are reacted in a ratio of about 1:1–1.2 equivalents of epoxide to amine groups, so as to react essentially all of the epoxide groups. Subsequently, between about 0.3–1.0 of the hydroxyl groups of the adduct are reacted with the vinyl monomer.

15 Claims, No Drawings

RESIN BINDER FOR FIBER COMPOSITE MATERIALS

This invention relates to preparation of a resin binder composition for composite materials. More particularly, this invention relates to a free radical curable amino vinyl resin binder composition for fiber reinforced composite materials with improved interlaminar shear strength and reduced cure time. Still, more particularly, the invention relates to a free radical curable resin binder prepolymer prepared by reacting an epoxy and a secondary amino alcohol and subsequently an unsaturated monomer having a hydroxy reactive functionality and a terminal vinyl group. The prepolymer is cured with a crosslinkable vinyl monomer diluent.

BACKGROUND OF THE INVENTION

1. Field of the invention

Fiber reinforced composite materials can be used to manufacture components by processes which include reaction injection molding, compression molding, pultrusion or filament winding. Advantageously, components so manufactured have better or comparable physical properties than components made of conventional compositions while being substantially lighter in weight and also corrosion resistant. In addition, less energy is generally required to manufacture a fiber reinforced composite component than is necessary to manufacture the functionally equivalent component made of conventional materials, such as steel. Still further, this replacement component is often smaller in size than the conventional component, a relevant consideration for manufacturing operations wherein components are shipped. These features of resin-fiber components would obviously be of great importance in a variety of applications, one particularly of interest being the manufacture of car components, where these composite materials could be fabricated into, for example, leaf springs and body support members.

Leaf springs made from the resin-fiber composites of the subject invention possess at least 25% greater interlaminar shear strength and more than 2 times greater impact total energy (Ft-lbs) than those made of commercially available vinyl ester material. Additionally, these springs weigh 40% less than conventional springs. It appears that leaf springs made of the binder-fiber composite, of this invention, in view of their physical properties, also would be suitable for use in trucks.

The resin of this invention has been found to be an excellent binder for chopped, woven, or continuous fiber (e.g., graphite, glass and Kevlar) reinforced composites. It exhibits good wetting of the fibers, fast gelling and rapid cure. In addition, the binder of this invention, when reinforced with fiber, possesses excellent physical properties, including increased interlaminar shear strength, when compared to composites made with currently available vinyl ester or polyester binders. Furthermore, although one advantage of the subject binder is its potential for extremely rapid cure, the addition of a cure inhibitor prior to the addition of the initiator, for ambient temperature cure, can prolong gel time and retard the cure rate. Thus, by selecting the particular cure initiator or inhibitor and initiator, cure time can be tailored to meet the specific cure conditions preferred for the binder-fiber composites. Additionally, the low viscosity of the subject binder composition contributes to its advantageous suitability for a variety of uses and processes.

2. Description of the Relevant Art

U.S. Pat. No. 3,971,834 to Uzelmeier et al teaches reacting a polyepoxide with both a secondary amine and an ethylenically unsaturated conjugated carboxylic acid to form a photocurable acrylate resin coating exhibiting improved adhesion to metals. U.S. Pat. No. 4,253,918 to Traenekner et al teaches reacting polyepoxides with both (meth) acrylic acid and a nitrogen containing compound to form air drying coating compositions, preferably from use on paper and cardboard.

As in this application, which claims the reaction of a polyepoxide with a secondary amino alcohol, these patents teach that a polyepoxide may be reacted with a secondary amino alcohol. However, while both of these patents teach reacting only a portion of the available epoxide groups of the polyepoxide with the amino compound, the subject application claims reacting the epoxy and amino groups in about a 1:0.95–1.2 equivalent ratio, so as to react substantially all of the epoxide groups of the polyepoxide with the amine. In these patents, the unreacted epoxide groups of the polyepoxide are reacted with an unsaturated acid. However, in the case of the subject invention, wherein substantially all of the epoxide groups have been reacted, the hydroxyl moiety of the epoxy-amino alcohol adduct is then reacted with a vinyl containing compound through a hydroxy reactive functionality of the vinyl compound, (e.g., the epoxide of glycidyl methacrylate). Thus in these patents, the vinyl unsaturation is added at one end of the polyepoxide and the amine alcohol, when used, is added at the opposite end of the polyepoxide, while in the subject application, the amino alcohol and the vinyl unsaturation are added, in stepwise fashion, at each end of the polyepoxide.

An object of this invention is to prepare resin-binder compositions, which cure more rapidly than conventional compositions, and which in combination with reinforcing fiber show improved interlaminar shear strength. It has now been found that incorporation of the tertiary amine into the epoxy backbone in combination with the terminal vinyl unsaturation added to the adduct gives a composition with these highly desirable characteristics. In particular, it appears that the incorporated tertiary amine serves as a catalyst for the addition of the vinyl unsaturation as well as for subsequent crosslinking of the prepolymer vinyl group with vinyl groups of the diluent during cure.

BRIEF DESCRIPTION OF THE INVENTION

This invention relates to a free-radical curable amino vinyl resin-binder composition for use in fiber reinforced composite materials comprising fiber material and binder and exhibiting improved interlaminar shear strength and reduced cure time. The binder of the invention comprises between about 80 to about 20 parts by weight of an amino vinyl resin prepolymer and between about 20 and about 80 parts by weight of a crosslinkable vinyl diluent. Additionally, this invention relates to a process for making such binder-fiber composites with improved interlaminar shear strength and reduced cure time. The prepolymer consists essentially of a two step reaction product, wherein a polyepoxide containing at least two terminal epoxide groups is first reacted with a secondary amino alcohol in a ratio of about 1:0.95–1.2 chemical equivalents of epoxy to amino groups. The adduct formed, which has hydroxyl groups, is then reacted with an unsaturated monomer having a terminal vinyl group and a functionality which reacts with the hydroxyl groups of the adduct, forming the amino vinyl ester resin prepolymer. The unsaturated monomer having a terminal vinyl group is reacted in an amount sufficient to provide between about 0.3–1.0 equivalents of the hydroxy reactive functionality for each equivalent of the hydroxyl group of the adduct. A diluent consisting of a crosslinkable ethylenically unsaturated monomer containing one or more vinyl groups crosslinks with the amino vinyl ester resin prepolymer during cure by means of a peroxide or peroxide sensitizing initiators.

DETAILED DESCRIPTION OF THE INVENTION

As discussed generally above, the invention comprises a free-radical curable amino vinyl resin-binder composition for fiber reinforced composite materials. The synthesis of the amino vinyl reaction product comprises first reacting a polyepoxide having terminal epoxide groups with a secondary amino alcohol.

The epoxy and amino alcohol are reacted in a ratio of about 1:0.95–1.2, most preferably about 1:1 chemical equivalents of epoxy to amino groups, so as to provide sufficient amine to react substantially all of the epoxide groups of the polyepoxide. In some embodiments of this invention, an excess of amine may be suitably used, as would be apparent to one skilled in the art. For example, if glycidyl methacrylate is to be subsequently used for the second reaction step, the excess amine and glycidyl methacrylate can suitably act as a diluent. However, if isocyanato ethyl methacrylate is to be used in the subsequent reaction step, for example, excess amine would not be particularly suitable since it catalyzes this subsequent reaction at an undesirably rapid rate.

Generally, solid epoxy is dissolved in the heated liquid amino alcohol, and reacted at elevated temperatures, generally above about 80° C., to facilitate the reaction between the epoxy and amino alcohol to form the adduct. The epoxy and amino alcohol are reacted at conditions that allow opening of the epoxide ring by the active hydrogen of the amine and provide a gel free reaction product. The reaction is complete when the product is essentially free of unreacted epoxide groups, as determined by Infrared Spectroscopy. This reaction incorporates a tertiary amine into the epoxy backbone and adds hydroxyl groups to the adduct. Thus this reaction step has added hydroxyl groups suitable for further reacting as well as incorporated a tertiary amine group which will act as an internal catalyst for this subsequent reaction. While a diluent, such as that described below, may be used as a reaction medium, the prepolymer may also be prepared without the use of such a diluent.

After completion of the epoxy and amino alcohol reaction, the resulting adduct is reacted with a terminal vinyl monomer, i.e., a monomer with terminal vinyl unsaturation, having functionality which reacts with the hydroxyl groups of the adduct. The adduct and the terminal vinyl monomer are reacted in an amount sufficient to provide between about 0.3–1.0 equivalents of hydroxy reactive functionality of the monomer for each equivalent of hydroxyl group of the adduct. The internal tertiary amine catalyzes the reaction of the hydroxyl groups of the adduct with the hydroxy reactive functionality of the monomer, as e.g., the isocyanate of isocyanato ethyl methacrylate (IEM) or the epoxide of glycidyl methacrylate, (GMA) wherein the terminal vinyl group is left intact. Added catalysts may be used to further catalyze this reaction, in addition to the incorporated tertiary amine mentioned, and are well known in the art. Organometallic compounds such as organo tin or lead, for example, are known to be effective catalysts for the isocyanate/hydroxyl reaction.

The particular optimal ratio of terminal vinyl monomer to adduct appears to depend, in particular, on the number and type of hydroxyl groups in the amino alcohol reacted to form the adduct. For example, in a most preferred embodiment, wherein a secondary amine having only primary hydroxyl (alcohol) groups is reacted to form the adduct, it is most preferable to react the adduct and this terminal vinyl monomer in about 1:1 chemical equivalents of the primary hydroxyl (alcohol) groups of the adduct to the hydroxy reactive functionality of the vinyl monomer, in order to obtain optimum physical properties, in particular interlaminar shear strength. By primary hydroxyl (alcohol) groups is meant the primary hydroxyl (alcohol) groups originally present in the amino alcohol, in contrast to the secondary hydroxyl groups formed on the adduct as a result of the opening of the epoxide ring. Thus in the case of a most preferred embodiment, wherein diepoxide is reacted with alcohol comprising diethanol amine, the terminal vinyl monomer would be reacted with the adduct in an amount sufficient to provide between about 0.6–0.7 equivalents of hydroxy reactive functionality for each equivalent of hydroxyl group of the adduct. It should be noted, however, that although the monomer appears to react predominately with the primary hydroxyl (alcohol) group, some reaction may take place with the secondary hydroxyl group formed as a result of the opening of the epoxide ring. It has been theorized that this preferred ratio is related to optimal considerations involving steric hinderence, based on the preferred embodiment of the subject binder composition. However, it has been determined and will be apparent to one skilled in the art, that with other less preferred embodiments of the subject binder composition, ratios other than the 1:1 noted above may be suitably used, and as such are meant to be included within the scope of the subject invention.

The amount of diluent comprising crosslinkable ethylenically unsaturated materials is now suitably adjusted so that the composition of the binder includes from about 20 to about 80 weight percent amino vinyl prepolymer and from about 80 to about 20 weight percent diluent. For applications as for example leaf springs, wherein maximum interlaminar shear strength is desired, the composition of the binder preferably comprises from about 55 to 75 weight percent prepolymer and from about 45 to 25 weight percent crosslinkable diluent, most preferably about 60 percent prepolymer and about 40 percent diluent. The actual relative weight percents however will be based on the particular use and properties desired of the binder-fiber composite, as would be apparent to one skilled in the art.

Curing of the system is achieved through the crosslinking of the unsaturated monomer diluent and the vinyl groups of the prepolymer by means of free-radical initiators. It can take place at either elevated or ambient temperatures, the particular temperature being dependent on the particular process and properties of the binder-fiber composite desired. For example, in applications involving filament winding, e.g., in order to allow for adequate wetting of the fibers by the binder composition, particularly the diluent, a cure time of perhaps ½ hour at ambient temperature is preferred. However, in applications involving compression molding, a faster cure time of about 2 minutes at elevated temperatures of about 150° C. would be preferable. This, of course, would be further dependent on the particular amino vinyl ester resin-diluent composition used.

In the case of ambient temperature curing, the rate of crosslinking as well as the time required for gelation can be fully controlled. The prepolymer, which itself contains a built in amine catalyst, in the presence of crosslinkable monomer (e.g., styrene) gels rapidly with diacyl peroxide (e.g., benzoyl peroxide) or with transition metal salt activator and ketone peroxide type of initiator. In applications wherein longer gel time and slower cure rate is essential, it has been found that acrylic or methacrylic acid added to the prepolymer system prior to the addition of the initiator or activator/initiator will prolong the gel time as well as retard the curing rate. This acid itself can then be copolymerized into the matrix system during curing of the composition.

Each of the components of the resin composition within the scope of this invention are described hereinafter in greater detail.

Polyepoxide

The epoxy reactant of the subject invention should contain, on the average, about two, epoxide groups per molecule, and is preferably free of carboxy ester moieties linking the epoxide groups. The polyepoxide may contain three or more epoxide groups; particularly in view of availability and cost considerations, however two appears to be preferable. The molecular weight (number average) of the polyepoxide is generally between about 300 and about 10,000.

The polyepoxide compounds used may be polyglycidyl ethers of polyhydric phenols, such as, for example, pyrocatechol, resorcinol, 4,4'-dihydroxydiphenyl methane, 4,4'-dihydroxy-3,3'-dimethyl diphenyl methane, 4,4'-dihydroxy diphenyl dimethyl methane (bisphenol A), 4,4'-dihydorxy diphenyl methyl methane, 4,4'-dihydorxy-3,3'-dimethyl diphenyl propane, 4,4'-dihydroxy diphenyl, of 4,4' dihydroxy diphenyl sulfone, tris-(4-hydroxy phenyl)-methane, the chlorination and bromination products of the aforementioned diols.

In particular, one class of suitable epoxy compounds for the epoxy reactant includes reaction products of di or polyhydric, mono, di or polycyclic compounds with epihalohydrins of the formula

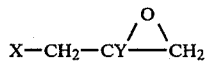

wherein X is halogen such as chloro and Y is hydrogen or lower alkyl such as methyl or ethyl, which epihalohydrin reaction products are exemplified by such straight chain epoxy terminated compounds containing glycidyl ether groups as bis-phenol-A-epichlorohydrin reaction products that are commercially available such as, for example, Epon 828, 836, 1001, 1004 or 1007 (marketed by Shell Chemical Company) or Araldite 6010, and 8011 (marketed by Ciba-Geigy). In one preferred embodiment, the epoxy comprises Araldite 8011, a bromine containing diepoxy. Inclusion of the bromine functionality in the epoxy gives fire retardant properties and appears to enhance physical properties of the composite, particularly the interlaminar shear strength. Such products contain aromatic groups as benzene nuclei at a preferred average of at least about one, more preferably for this invention at least about two, on the average, for each terminal epoxide group. Especially suitable are bis-phenol-A-epichlorohydrin reaction products comprising in major amounts up to 10 or more bis-phenol moieties within the epichlorohydrin reaction product backbone, e.g., molecular weights in a range of up to about 8000, preferably 350–4000, on a number average basis ($M_n$).

Other examples of epoxy compounds for the epoxy reactant include polyepoxide compounds (averaging more than about two epoxide groups per molecule) which are also commercially available. In this group of epoxy compounds are the novolac epoxy resins, e.g., Epon 1138 and 1139 (marketed by Shell Chemical Company) and Cresol novolac Araldite ECN 1235, 1273, 1280 and 1299 (marketed by Ciba-Geigy). These polyepoxy resins include epoxided products of phenol formaldehyde resins that contain terminal glycidyl ether groups from aromatic moieties. As would be apparent to one skilled in the art, mono-epoxy compounds can also be used in the composition of this invention, as, for example, a solvent for the solid polyepoxides in order to facilitate processing.

Compatible mixtures of any of these epoxy compounds are also suitable.

Secondary Amino Alcohol

The secondary amino alcohol is chosen preferably from hydroxyl alkyl secondary mono amines, although the aliphatic carbon chain may be interrupted or substituted with non-interferring atoms such as oxygen, etc.

A class of preferred hydroxy alkyl secondary amines are illustrated according to the formula:

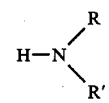

wheren R and R' are selected from the group consisting of a straight or branched chain aliphatic of up to about 10 carbons and a straight or branched chain hydroxyl substituted aliphatic of up to about 10 carbons, providing that at least one of R or R' is a hydroxyl substituted aliphatic and the hydroxyl is not attached to a carbon that is adjacent to the amino nitrogen. More preferably, the alkyl groups R and R' are lower alkyl, e.g., up to 7 carbon atoms each and additionally most preferably, both R and R' are hydroxyl substituted aliphatic. In this invention the hydroxyl substituted aliphatic, from which R and R' are selected, is meant to include aliphatics having one or more hydroxyl group substitutions. However, this hydroxyl substituted aliphatic preferably has no more than two hydroxyl groups, and most preferably contains only one hydroxyl which is a (terminal) primary hydroxyl group.

Examples of suitable secondary amino alcohols include methyl ethanol amine, 2-ethyl amino ethanol, isopropyl ethanol amine, diethanol amine, diisoproponal amine, ethanol propanal amine, phenylethanol amine, and the like. Especially preferred, are the dialkanolamines, most particularly diethanol amine. Mixtures of various suitable secondary amino alcohols may also be employed in this invention. Thus it can be seen, that the polymer reaction product of, for example, a preferred embodiment secondary amino alcohol and a diepoxide can contain from 2 to 4 primary hydroxyl (alcohol) groups. However, more preferably, this adduct contains on the average, 3 to 4 primary hydroxyl (alcohol) groups, most preferably about 4 groups.

Since the resins prepared according to this invention may be viscous, it is generally preferred to employ secondary amino alcohols that result in resins with reduced viscosity, generally those secondary amino alcohol with relatively low molecular weights Accordingly, among secondary aliphatic monoamines, it is generally preferred to employ lower alkyl amines. It is also preferred to employ aliphatic rather than aromatic secondary monoamines. The suitability of these and other secondary amino alcohol within the scope of this invention will be apparent to one skilled in the art.

Monomer Having Terminal Vinyl Group

This monomer reactant is chosen so as to possess a functionality which reacts with the hydroxyl group of the epoxy-amino alcohol adduct, predominately with the hydroxyl groups originally present on the amino alcohol. This monomer reactant additionally possesses terminal vinyl unsaturation. Suitable monomers comprise glycidyl acrylate, glycidyl methacrylate, isocyanatoethyl methacrylate (IEM), and allyl glycidyl ether. Other suitable monomers include the ethylenically unsaturated conjugated organic carboxylic acids including aliphatic, cycloaliphatic, and aromatic and also includes mono-carboxylic acids and poly-carboxylic acids. The term "conjugated" refers to the relative location of the unsaturation linkage and the carboxyl group. Suitable examples include acrylic and methacrylic acid, cyclohexane carboxylic and maleic, etc. Whereas the (meth) acrylates are preferred, isocyanatoethyl methacrylate is most preferred.

As previously discussed, the preferred embodiment epoxy-alkanol amine adduct and this vinyl monomer are preferably reacted in about 1:1 equivalent ratios of primary hydroxyl (alcohol) groups of the adduct to hydroxyl reactant functionality of the vinyl monomer, thus adding maximum optimal terminal vinyl unsaturation to the polymer. With the completion of a preferred embodiment prepolymer formation according to this invention, and when using IEM in the 1:1 ratio just described, it has been found that no free isocyanates are left in the prepolymer, all have been incorporated into the prepolymer (as determined by Infrared Spectroscopy), an aspect of the invention of interest in view of toxicological considerations.

The tertiary amine incorporated into the epoxy backbone, as discussed above, acts as internal catalyst for this reaction with the hydroxyl (alcohol) group. Suitable monomer materials will predominately react at this site than at the hydroxyl group generated with the opening of the epoxide ring on the polymer by the amino alcohol in the first reaction step. It can be seen that in the preferred embodiment, since the adduct preferably contains on the average of about four hydroxyl (alcohol) groups, the preferred prepolymer will subsequently contain about four terminal vinyl groups.

The diluent employed includes ethylenically unsaturated monomers crosslinkable with amino vinyl resin prepolymer during curing of the composition. Additionally, these diluents serve to wet the fibers in the preparation of the composite prior to curing. Since the prepolymer may be a high viscosity product, these monomers also serve to suitably decrease the composition viscosity to processable levels and additionally may serve to vary the properties of the cured composite.

These vinyl monomers may be multifunctional or monofunctional with respect to the vinyl groups, with the latter being preferred. It is particularly preferred that the vinyl group be a terminal vinyl group. Suitable diluents include aromatic vinyl and divinyl compounds such as divinyl benzene, vinyl toluene, alpha methyl styrene, t-butyl styrene, chloro sytrene, diallylphthalate, and aryl diglycol carbonate. Also suitable are esters of acrylic or methacrylic acid with aliphatic $C_1$–$C_8$, cycloaliphatic $C_5$–$C_6$, or aromatic $C_7$–$C_8$ monoalcohols, for example methyl acrylate, ethyl acrylate, n-propyl acrylate, benzyl acrylate, 2-ethyl acrylate and the corresponding methacrylic acid esters. Additionally, diacrylates and polyacrylates can be used, such as, for example, ethylene glycol diacrylate, 1,3 propane diol diacrylate, trimethylol propane triacrylate and the like. Vinyl alkyl ethers with 1 to 4 carbon atoms in the alkyl group, such as vinyl methyl ether, vinyl ethyl ether and vinyl butyl ether are also suitable. It is also possible to use such diluents as acrylonitrile and methacrylonitrile. Styrene is particularly preferred. It is also possible to use mixtures of one or more of the aforementioned monomers. The diluent comprises between about 20–80 weight percent of the amino vinyl resin composition with the particular weight percent dependent on the particular viscosity as well as properties required of the resin composition and of the composite.

Initiator

When curing the subject composite at elevated temperatures, a tertalkyl peroxyester

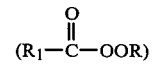

is generally used as the initiator for the amino vinyl ester resin prepolymer vinyl diluent crosslinking reaction. One such suitable ester initiator is t-butyl perbenzoate. Curing at elevated temperatures, herein meant to be about 150° C., is particularly desirable for compression molding of the subject binder-fiber composition, wherein fast cure is required, i.e., a cure time of about 2 minutes. Generally a post cure step at elevated temperatures is desirable in order to achieve peak mechanical properties in the composite.

At ambient temperatures, a hydroperoxide type of initiator, which is activated by an organic salt of a transition metal may be used. A suitable activator/initiator system of this type includes cobalt/methyl ethyl ketone peroxide. Additionally at ambient temperatures, a diacyl peroxide initiator such as dibenzoyl peroxide may be used to initiate the crosslinking reaction. Both the hydroperoxide and the diacyl peroxide are activated by the tertiary amine, incorporated into the epoxy polymer backbone, at ambient temperatures. Thus, the incorporated tertiary amine acts as a catalyst during prepolymer preparation, as discussed previously, and as an activator during the subsequent crosslinking reaction. Gelling of the subject resins at room temperature, for example, using methyl ethyl ketone peroxide coupled with cobalt activator occurs within 10 minutes whereas a commercial vinyl ester under the same conditions takes more than six hours to gel.

In the case of ambient temperature curing, the rate of crosslinking as well as the time required for gelation can be fully controlled. The prepolymer, in the presence of crosslinkable monomer (e.g., styrene) gels rapidly with diacyl peroxide or with transition metal salt/ketone peroxide type of initiator. For some application methods, however, a longer gel time and slower curing rate are desirable. For these applications, it has been found that, by adding acrylic or methacrylic acid to the prepolymer system prior to the addition of the activator/initiator, the gel time is prolonged and the curing rate is retarded. The acid itself can be copolymerized into the matrix system. Thus in those applications requiring wetting of the fibers, as for example filament winding wherein the fibers are drawn through a binder bath, and then processed, slower cure rate, for example, 30 minutes would be preferred, the curing can be delayed as described above.

While the cobalt/methyl ethyl ketone peroxide activator/initiator system is generally used in the composition of the subject invention, other suitable activator/initiator systems will be apparent to one skilled in the art. Additionally, suitable systems employing high-energy radiation, such as UV-light, electron rays or gamma rays, may be used to cure the composition. In the case of UV-light cure, photoinitiators such as benzophenone are generally added. Such suitable systems are well known and would be apparent to one skilled in the art.

The activator/initiator is incorporated with the binder and then processed with the fibers to make composites. However, in the case of filament winding processing, for example, wherein unidirectional continuous fibers are drawn through a binder bath prior to composite forming and curing, several activator/initiator binder bath systems are possible. In one system, the activator$_1$/initiator$_1$ binder are combined in a single bath. In another system, the binder is divided into two separate baths, after which activator$_1$ is added to the first binder bath and initiator$_1$ is added to the second binder bath. Filaments are then drawn through either the first or second bath respectively and alternately layered together so as to place activator$_1$-binder and initiator$_1$-binder compositions in close proximity for subsequent curing. In yet a third system, the binder is divided between a first and second bath, wherein to the first binder bath is added activator$_1$/initiator$_2$ and to the second binder bath is added activator$_2$/initiator$_1$. In this system, activator$_1$ does not reactively effect initiator$_2$ and likewise activator$_2$ does not reactively effect initiator$_1$. However, when filaments which have been drawn through the first or second bath are alternately layered so that activator$_1$ and initiator$_1$ can come in close proximity (as well as activator$_2$ and initiator$_2$), the binder-fiber composite can be cured. Such a system, as the third described above, is taught in commonly owned U.S. patent application No. 319,535 filed Nov. 9, 1981 in the name of Fesko, and is hereby incorporated by reference in the subject application as teaching a curing process suitable for use with the subject binder composition.

The composition can additionally include other materials generally used to modify such resins. These include plasticizers, stabilizers, extenders, oils, rubber resins, as well as types of coloring or pigments to give the material desired color. It is often useful to add a free-radical inhibitor, such as hydroquinone, to the ethylenically unsaturated monomer reactant.

The fiber materials used to form the composites of the subject invention may include unidirection continuous fiber materials, woven fabric or chopped fibers, which may be, for example, glass, Kevlar or graphite.

These fibers may be mixed with the resin-binder prior to molding or coated with the binder prior to processing for a varity of applications. The optimal amount of fiber in the composite may vary. The particular use and particular composition of the binder will suggest the preferred amount of fiber to be used, as will be apparent to one skilled in the art. It is understood by one skilled in the art that since interlaminar shear strength is determined when the stress in the system imposes the shear force along these lines of weakness within the matrix or at the fiber matrix interface and as such, interlaminar shear strength is relatively independent of the fiber matrix concentration. In addition to the fibers, the composition can also include particulate fillers, particularly mineral fillers such as calcium carbonate. Other suitable fibers and fillers will be apparent to one skilled in the art.

The binder-fiber composition of the subject invention advantageously combines a low viscosity for good processability and a fast cure rate, with excellent physical properties, such as interlaminar shear strength which makes it ideally suited for a variety of applications involving composite materials.

The following examples are presented by way of description of the process of the invention and to set forth the best mode contemplated by the inventors, but are not to be construed as limiting.

EXAMPLE I

I. To a suitably equipped reaction vessel, 10.9 parts of diethanol amine is charged and heated to 60°±5° C. 19.7 parts of Araldite 6010[1] is added to the reaction vessel rapidly. After a short induction period, the temperature reaches 175°±5° C. The heating device at this point is removed and the system is cooled to 115°±5° C. 29.4 parts (with 0.037 part hydroquinone) of glycidyl methacrylate (GMA) is added to the epoxy-amino alcohol adduct dropwise. The temperature is maintained at 115°±5° C. throughout the entire reaction. The reaction system is blanketed with dried air at this step. After the addition of GMA, the reaction is continued for another two hours. At the end of the reaction, the system is cooled to 90° C. and 40 parts of styrene are added. The prepolymer so obtained has an amber color and a viscosity of about 5000 cps at ambient temperature.

A. 100 grams of the above prepolymer with 0.1 part of Co (CHEM-ALL[2] (6% Cobalt) and 1 part of methyl ethyl ketone peroxide (MEKP) gives a gel time of approximately seven minutes, whereas a 100 grams sample with one grams of benzoyl peroxide gives a gel time of approximately 12 minutes.

II. A graphite* composite laminate is prepared using the above prepolymer with one part of t-butyl perbenzoate (tbpb) per hundred parts of resin (phr). The composite is molded at 150° C. for 20 minutes (starting from ambient temperature) in a positive displacement compression molding mold. Interlaminar shear strength was measured to be 38 MPa. The above composite contains 18.1% resin and 81.9% graphite by weight.

*Graphite fibers used are Celion 6000 manufactured by Celanese Chemical Co.

[1] Araldite 6010 is an epoxy resin manufactured by Ciba Geigy Corporation.

[2] Co CHEM-ALL is a product of Mooney Chemicals, Inc.

EXAMPLE II

The procedures of Example I is followed except that Araldite 6010 is replaced by Epon 1001[1]. The solid epoxy resin is first pulverized and then added to the heated amine. The following composition is used:

| Material | Parts by Weight | |
|---|---|---|
| Epon 1001 | 33.4 | |
| Diethanol Amine | 7.2 | |
| Glycidyl Methacrylate | 19.4 | |
| Styrene | 40.0 | (containing 0.023 parts hydroquinone) |

[1]Epon 1001 is an epoxy manufactured by Shell Chemical Co.

Graphite composite prepared from this resin gives a interlaminar shear strength of 41 MPa. This composite comprises 21.7% resin and 78.3% graphite by weight.

EXAMPLE III

The procedures of Example I is again followed with the following differences:

Epon 1007[1] is used in place of Araldite 6010. The solid resin is pulverized and added to the heated amine. The following composition is used:

| Material | Parts by Weight | |
|---|---|---|
| Epon 1007[1] | 51.2 | |
| Diethanol Amine | 2.4 | |
| Glycidyl Methacrylate | 6.4 | |
| Styrene | 40.0 | (containing 0.008 parts hydroquinone) |

[1]Epon 1007 is an epoxy manufactured by Shell Chemical Co.

The temperature is maintained at 180° C. throughout the addition of the solid resin. After the first step, 18.9 parts of styrene is added to lower the viscosity before the addition of GMA. The temperature is maintained at the vicinity of 120° C. during the addition of GMA. The rest of the styrene is added at the end of the post reaction.

One phr of tbpb is used for curing the graphite composite prepare from this prepolymer. Interlaminer shear strength is found to be 50 MPa. The graphite composite comprises 16.1% resin and 83.9% graphite by weight.

EXAMPLE IV

A series of prepolymers is prepared with the composition listed in the following table:

| | Amino Alcohol Diethanol/2-ethyl Amine/Amino ethanol (Amine equivalents) | GMA (Equiv.) | Interlaminar Shear Strength (MPa) | Gel Time (Min) |
|---|---|---|---|---|
| A | 0/1.0 | 1.0 | 38 | 46.3 |
| B | 0.25/0.75 | 1.25 | 38 | 27.0 |
| C | 0.5/0.5 | 1.50 | 43 | 14.0 |
| D | 0.75/0.25 | 1.75 | 47 | 7.5 |
| E | 1.0/0 | 2.0 | 40 | 7.8 |

Araldite 6010, a diepoxide, was used as the starting material for the above compositions, which are based on one equivalent of epoxy. The amino alcohols are mixed at ambient temperature before the reaction. The procedure outlined in Example I is followed. All prepolymers are adjusted to contain 40% by weight of styrene. Graphite composites are prepared using one phr of tbpb. The interlaminar shear strengths are listed in the above table. The graphite composites comprise about 15-25% graphite by weight. The gel times with 0.1 cobalt and 1.0 part MEKP are also listed for comparison.

The incorporation of organic acid into the prepolymer system together with cobalt/MEKP initiator retards the gel time. The following example illustrates:

EXAMPLE V

The following composition is made up for measureing the gel time of the prepolymer:

| Material | Parts by Weight |
|---|---|
| Prepolymer from Example I | 97 |
| Acrylic Acid | 3 |
| Co CHEM-ALL (6% Cobalt) | 0.1 |
| MEKP | 1.0 |

The above formulation with a 100 grams sample gives a 60 minutes gel time.

EXAMPLE VI

Fiber composites, both glass and graphite fibers are prepared from the prepolymer of Example I with the same formulation as in Example V.

The impregnated fibers are molded at ambient temperature and further post cured at 150° C. for 20 minutes (starting from ambient temperature).

The following mechanical properties are obtained from the above molding.

| | Ambient Temperature Cure | | Post Cure | |
|---|---|---|---|---|
| Fiber | Flexural Modulus* | Interlaminar Shear Strength | Flexural Modulus* | Interlaminar Shear Strength |
| E-Glass | $5.1 \times 10^4$ MPa | 27 MPa | $5.7 \times 10^4$ MPa | 50 MPa |
| Graphite | $9 \times 10^4$ MPa | 25 MPa | $9 \times 10^4$ MPa | 45 MPa |

*Flexural modulus of the composite are normalized to 62% fiber volume

In the following examples, glycidyl methacrylate is replaced by isocyanatoelthyl methacrylate. Essentially all the examples cited previously using glycidyl methacrylate can be substituted by isocyanatoethyl methacrylate with the following modifications of reaction conditions:

EXAMPLE VII

The same apparatus is used for preparing prepolymers containing isocyanatoethyl methacrylate as in Example I. 18.84 parts of Araldite 6010 is dissolved in 40 parts of styrene (with 2.08 part of hydroquinone) and heated to 50° C. 10.41 parts of diethanolamine is added rapidly to the heated mixture. The mixture is further heated to 80° C. and then cooled to about 30° C. (total of about 4 hours). Phase separation is also observed since the adduct is not soluble in the styrene. At this point, 30.75 part of isocyanatoethyl methacrylate[1] (IEM) with 0.06 part of hydroquinone is added dropwise to the epoxy-amino alcohol adduct. The temperature is maintained at 30°±5° C. The reaction is continued for another 24 hours at ambient temperature or until the total disappearance of the isocyanate group (by infrared spectrometry). A composite is prepared from this prepolymer using one phr of tbpb and graphite fibers. The composite is molded at 150° C. for 20 minutes (starting from ambient temperature). The interlaminar shear strength is found to be 54 MPa. A significant increase of the interlaminar shear strength is obtained by replacing GMA with IEM.

This composite comprises 20.2% resin and 79.8% graphite by weight.

(1)Isocyanatoethyl methacrylate is a product manufactured by Dow Chemical Co.

EXAMPLE VIII

The procedures of Example VII are followed with the following composition.

| Material | Parts by Weight | |
| --- | --- | --- |
| Epon 1001[1] | 32.8 | |
| Styrene | 40.0 | (including 0.08 parts hydroquinone) |
| Diethanol Amine | 6.9 | |
| IEM | 20.3 | (including 0.04 parts hydroquinone) |

[1]As defined in Example II.

A composite prepared from this prepolymer gives a interlaminer shear strength of 65 MPa.

The composite comprises 30.0% resin and 70.0% graphite by weight.

EXAMPLE IX

The procedures of Example VII are again followed with the following compositions as starting materials:

| Material | Parts by Weight |
| --- | --- |
| Araldite 8011[1] | 32.1 |
| Styrene | 40.0 |
| Diethanol Amine | 7.1 |
| IEM | 20.8 |

[1]Araldite 8011 is a brominated epoxy resin manufactured by Ciba Geigy Co.

A composite prepared from this prepolymer using one phr of tbpb and molding at 150° C. for 20 minutes gives a interlaminar shear strength of 67 MPa.

This prepolymer contains bromine in the epoxy backbone which renders fire retardant capability.

The composite comprises 45.0% resin and 55% graphite by weight.

EXAMPLE X

This Example demonstrates a two-components reaction baths process used to make continuous fiber leaf springs. The prepolymer used is that synthesized according to the procedures of Example IX.

| Materials | Parts by Weiqht |
| --- | --- |
| Bath A: | |
| Prepolymer from Example IX | 98.7 |
| Methyl ethyl ketone peroxide | 0.3 |
| t-butyl Peroctoate | 1.0 |
| Bath B: | |
| Prepolymer from Example IX | 98.8 |
| Co Chem-All (12% Cobalt) | 0.2 |
| t-butyl Peroctoate | 1.0 |

In using the above mentioned process, the resin gels at about 10 minutes. After finishing winding, the glass fiber and the spring is cut out after three hours from the mandrel and subjected to further curing at 150° C. for 45 minutes.

EXAMPLE XI

The prepolymer is prepared using the procedures outlined in Example I with the following composition and procedures modification:

| Materials | Parts by Weight |
| --- | --- |
| Epon 836[1] | 25.7 |
| Diethanolamine | 8.7 |
| Isocyanatoethyl methacrylate | 25.6 |
| Styrene | 40.0 |

[1]Epon 836 is an epoxy resin manufactured by Shell Chem. Co.

The Epon 836 is first heated to 60° C. and charged into the reaction vessel. The diethanolamine is also charged into the reactor and the mixture is brought to 55° C.±5° C. An exotherm of 153° C. is observed. The system is cooled to 120° C. 5° C. and maintained at this temperature for about two hours. A 40 parts of styrene is added to the reaction adduct and the system is further cooled to about 45° C.±. The isocyanatoethyl methacrylate is added at this point for about 40 minutes. Temperature is controlled to maintained at 45° C.±5° C. by the reaction exotherm itself or cooling. A 0.005 part of T-12 (Manufactured by M & T Chemicals Inc.) is added after about one hour at 40° C. 5° C. The hydroxyl isocyanate reaction is essentially completed at the end of the second hour after the addition of the tin catalyst. (As confirmed by Infrared Spectra) To the finishing reaction product, a 0.03 part of hydroquinone is added and the prepolymer is stored.

A composite prepared from this prepolymer using Celion 6000 TM (1) graphite fiber and 0.1 part of Co Chem-All (12% Cobalt) and 1.0 parts of MEK peroxide, molded at 150° C. (starting from ambient temperature) for 20 minutes, gives a interlaminar shear strength of 63 MPa. The composite comprises 56.5% resin and 43.5% graphite by weight.

(1)Celion 6000 is manufactured by Celanese.

In view of this disclosure, many modifications of this invention will be apparent to those skilled in the art. It is intended that all such modifications which fall within the true scope of the invention will be included within the terms of the appended claims.

What is claimed is:

1. A method of making a free-radical curable amino vinyl resin binder composition for fiber reinforced composite materials which comprises reacting about 80 to about 20 weight percent of an amino vinyl prepolymer and about 20 to about 80 weight percent of a crosslinkable ethylenically unsaturated monomer diluent, having one or more vinyl groups, which crosslinks with said prepolymer during curing by means of peroxide or peroxide sensitizing initiators, wherein said prepolymer consists essentially of the two step reaction product of:

(A) an epoxy-amino alcohol adduct reaction product of
  (i) polyepoxide containing terminal epoxide groups; and
  (ii) secondary amino alcohol, wherein (i) and (ii) are reacted in about a 1:1-1.2 ratio of chemical equivalent of epoxide to amino groups so as to react essentially all of said epoxide groups to form said adduct having hydroxyl groups; and (B) unsaturated monomer having a terminal vinyl group and having a hydroxy reactive functionality capable of reacting with said hydroxyl groups of said adduct and being selected from the group consisting of glycidyl acrylate, glycidyl methacrylate and isocyanatoethyl methacrylate,
wherein (A) and (B) are reacted in an amount sufficient to provide between about 0.3-1.0 equivalents of said hydroxy reactive functionality of said monomer (B) for each equivalent of said hydroxyl group of said adduct, and wherein said solvent which optionally may be employed in said method consists essentially of said diluent.

2. A method for making an amino vinyl ester resin binder composition according to claim 1, wherein said polyepoxide has a number average molecular weight between about 300 and about 10,000.

3. A method for making an amino vinyl ester resin binder composition according to claim 2, wherein said polyepoxide has a number average molecular weight between about 350 and about 4,000.

4. A method for making an amino vinyl ester resin binder composition according to claim 1, wherein said polyepoxide is brominated polyepoxide.

5. A method for making an amino vinyl ester resin binder composition according to claim 1 or 4, wherein said polyepoxide is diepoxide.

6. A method for making an amino vinyl ester resin binder composition according to claim 2, wherein said secondary amino alcohol has the formula

wherein R and R' are selected from the group consisting of straight or branched chain aliphatic groups of up to about 10 carbons, and straight or branched chain hydroxyl substituted aliphatic groups of up to about 10 carbons, providing that at least one of R or R' is a hydroxyl substituted aliphatic group and the hydroxyl is not attached to a carbon that is adjacent the amino nitrogen.

7. A method for making an amino vinyl ester resin binder composition according to claim 6, wherein said secondary amino alcohol is selected from the group of consisting essentially of (a) a secondary amino alcohol wherein R is (i) and R' is (ii);
(b) a secondary amino alcohol wherein both R and R' are (ii); and
(c) mixtures of (a) and (b).

8. A method for making an amino vinyl ester resin binder composition according to claim 6 or 7, wherein said hydroxyl substituted aliphatic group comprises a primary alcohol group.

9. A method for making an amino vinyl ester resin binder composition according to claim 8, wherein said secondary amino alcohol is selected from the group consisting of 2-ethyl amino alcohol, diethanol amine and diisopropanol amine.

10. A method for making an amino vinyl ester resin binder composition according to claim 8, wherein said (A) and (B) are reacted in about 1:1 chemical equivalents of primary hydroxyl (alcohol) group of said adduct to said hydroxy reactive functionality of said unsaturated monomer (B).

11. A method for making an amino vinyl ester resin binder composition according to claim 10, wherein said prepolymer comprises from about 75 to about 55 weight percent and said crosslinkable diluent comprises from about 25 to about 45 weight percent of said resin binder composition.

12. A method for making an amino vinyl ester resin binder composition according to claim 11, wherein said diluent comprises styrene.

13. A method for making an amino vinyl ester resin binder composition according to claim 1, which further comprises forming a composite by combining said binder composition with fiber materials, processing said composite into a desired shape, and curing said composite.

14. A method for making an amino vinyl ester resin binder composition according to claim 1, wherein said composition further comprises an organic unsaturated acid included in said composition prior to the addition of said initiator, said acid being included in said composition in an amount sufficient to effect retardation of at least some of the cure rate of the composition.

15. A method for making an amine vinyl ester resin binder composition according to claim 14, wherein said organic unsaturated acid is selected from the group consisting of acrylic acid and methacrylic acid.

* * * * *